(12) United States Patent
Borrmann

(10) Patent No.: US 7,296,806 B2
(45) Date of Patent: Nov. 20, 2007

(54) PALLET TRUCK

(75) Inventor: Hans-Peter Borrmann, Goch-Nierswalde (DE)

(73) Assignee: Borrmann GmbH, Goch-Nierswalde (DE)

( * ) Notice: Subject to any disclaimer, the term of this patent is extended or adjusted under 35 U.S.C. 154(b) by 293 days.

(21) Appl. No.: 10/505,271

(22) PCT Filed: Feb. 20, 2003

(86) PCT No.: PCT/DE03/00534

§ 371 (c)(1),
(2), (4) Date: Jan. 12, 2005

(87) PCT Pub. No.: WO03/070538

PCT Pub. Date: Aug. 28, 2003

(65) Prior Publication Data

US 2005/0116432 A1    Jun. 2, 2005

(30) Foreign Application Priority Data

Feb. 20, 2002  (DE) ............................... 202 02 592
Sep. 12, 2002  (DE) ............................... 202 14 152

(51) Int. Cl.
*B60P 1/02* (2006.01)
(52) U.S. Cl. .................................. 280/43.12; 414/495
(58) Field of Classification Search ............. 280/43.12, 280/43.17, 47.2, 641, 651, 38; 414/495, 414/608, 723, 785, 685, 705; 187/9 R
See application file for complete search history.

(56) References Cited

U.S. PATENT DOCUMENTS 3,188,107 A    6/1965  Quayle 3,421,775 A *  1/1969  Dugelay .................. 280/43.12
3,701,211 A * 10/1972  Best ........................ 280/43.12

(Continued)

FOREIGN PATENT DOCUMENTS

| EP | 0 978 437 | 2/2000 |
|----|-----------|--------|
| GB | 2 087 345 | 5/1982 |
| WO | WO00/68059 | 11/2000 |

OTHER PUBLICATIONS

International Search Report.

*Primary Examiner*—J. A Shriver
(74) *Attorney, Agent, or Firm*—Collard & Roe, P.C.

(57) ABSTRACT

The invention relates to a pallet truck comprising a lifting device, which is mounted on the axle of two wheels, and having a supporting frame, which is mounted on two rollers, provided with two bearers and is displaceably connected to the lifting device. The lifting device has a lifting pump mounted on a console which is placed on a support that is, in turn, mounted on the axle extending between both wheels. A rod is mounted on the lifting pump, and the lifting pump has a piston rod whose head projects upwardly out of the housing of the lifting pump. A roller is mounted at the rear end of each bearer, and the bearers are connected to one another at the front end via a crossbar. A holding frame having a socket is provided on the front end of the bearers and is mounted in an articulated manner on the head of the piston rod. A two-armed linkage is mounted on both sides of the console. The front arms of this linkage are connected to the console and the rear rod of the linkage is connected to the allocated roller each of which being connected in a manner that permits them to pivot. According to the invention, the pallet truck can be disassembled into two equally heavy parts, and the disassembled parts can be reassembled to form the pallet truck.

30 Claims, 15 Drawing Sheets

U.S. PATENT DOCUMENTS

Figure 1:
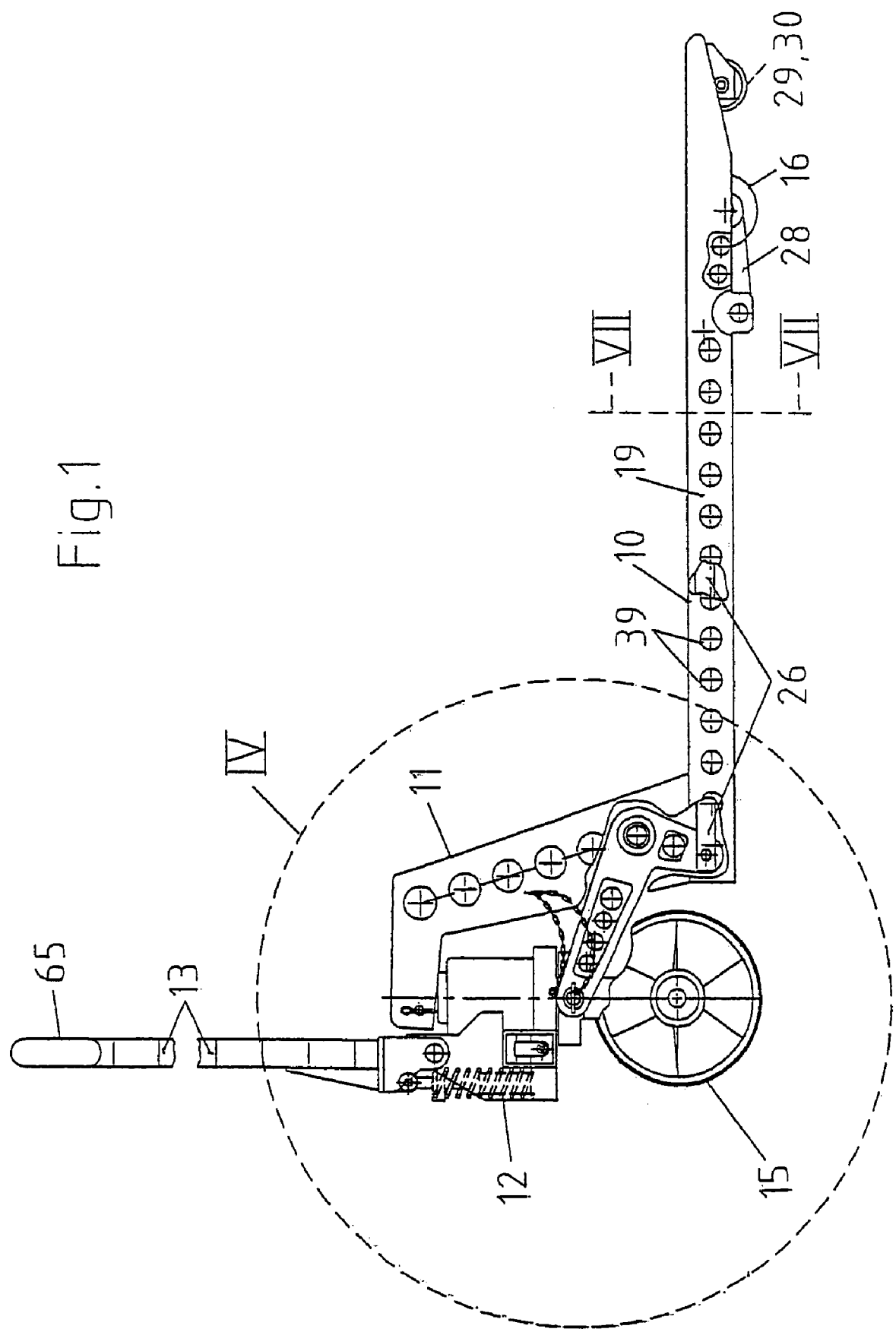

| | | | |
|---|---|---|---|
| 3,814,456 A * | 6/1974 | Bryntse | 280/43.12 |
| 3,982,767 A | 9/1976 | Larsson | |
| 4,497,501 A * | 2/1985 | Kedem | 280/43.12 |
| 4,577,463 A * | 3/1986 | Kedem | 60/426 |
| 4,589,669 A * | 5/1986 | Kedem | 280/43.12 |
| 4,895,042 A | 1/1990 | Wang | |
| 4,969,794 A * | 11/1990 | Larsen | 414/495 |
| 5,403,024 A * | 4/1995 | Frketic | 280/43.12 |
| 5,516,128 A * | 5/1996 | Nakade et al. | 280/43.12 |
| 6,260,646 B1 * | 7/2001 | Fernandez et al. | 180/65.6 |
| 6,540,241 B2 * | 4/2003 | Lee | 280/43.12 |
| 2002/0190489 A1 | 12/2002 | Lee | |
| 2005/0116432 A1 * | 6/2005 | Borrmann | 280/43.12 |
| 2006/0125196 A1 * | 6/2006 | Hartmann et al. | 280/43.12 |
| 2006/0181039 A1 * | 8/2006 | Fridlington et al. | 280/43.12 |
| 2006/0245907 A1 * | 11/2006 | Lee | 414/785 |

* cited by examiner

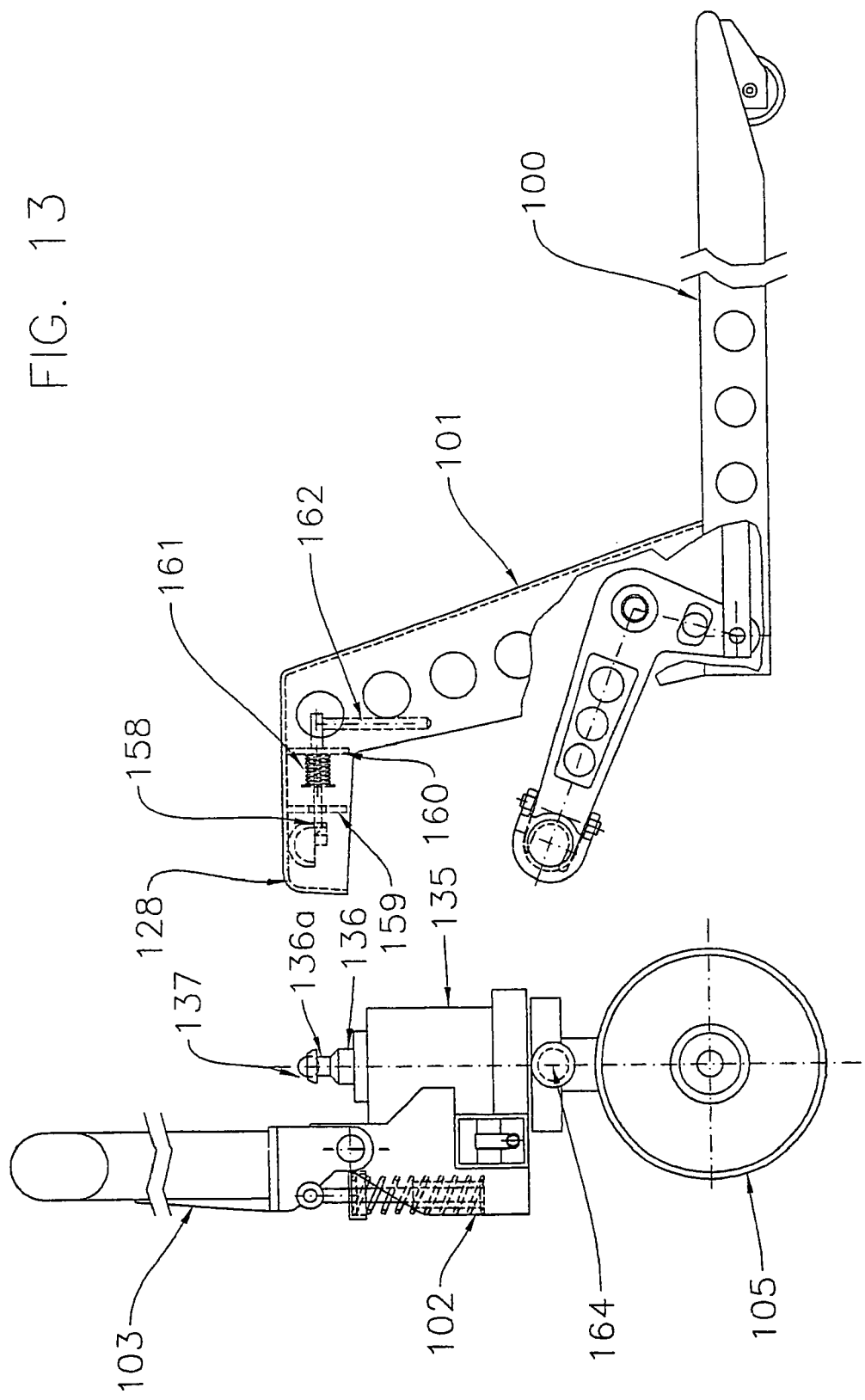

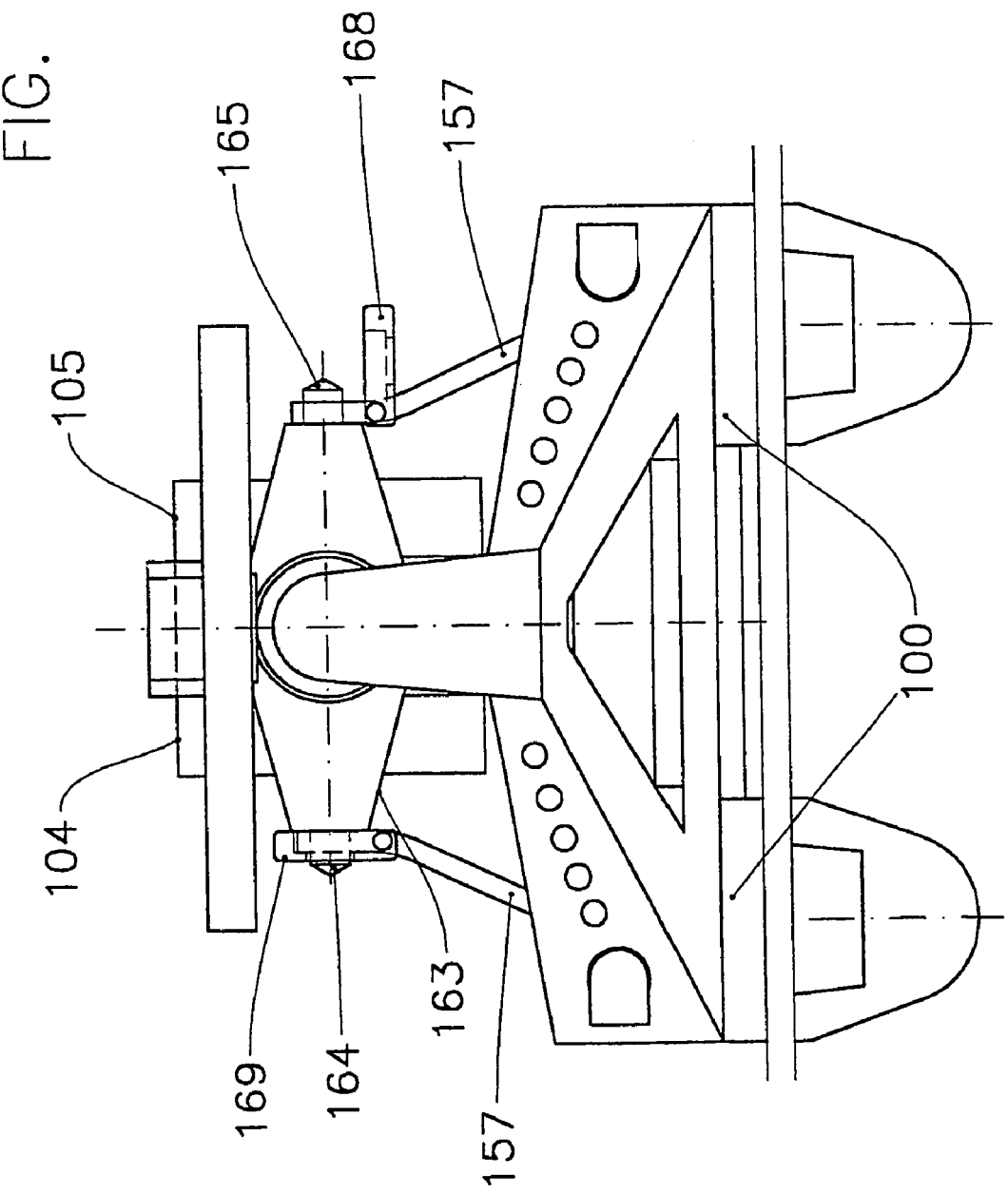

PALLET TRUCK

CROSS REFERENCE TO RELATED APPLICATIONS

Applicant claims priority under 35 U.S.C. 119 of German Application Nos. 202 02 592.6 and 202 14 152.7 filed Feb. 20, 2002 and Sep. 12, 2002, respectively. Applicant also claims priority under 35 U.S.C. 365 of PCT/DE03/00534 filed Feb. 20, 2003. The international application under PCT article 21 (2) was not published in English.

The invention relates to a pallet truck having a lifting device mounted on the axle of two wheels, and a supporting frame mounted on two rollers, having two bearers, which is movably connected with the lifting device, whereby the lifting device has a lifting pump arranged on a console, which is arranged on a support that is mounted on the axle between the two wheels, and whereby a rod is arranged on the lifting pump and the lifting pump has a piston rod, the head of which projects out of the housing of the lifting pump, in an upward direction, and whereby a roller is arranged at the back end of the two bearers, in each instance, and the bearers are connected with one another at the front end by way of a crossbar, and a holder frame having a socket is provided at the front end of the bearers, which socket is mounted on the head of the piston rod, in articulated manner, and whereby a two-armed linkage is arranged on both sides of the console, the front arms of which are connected with the console, and the back rod of which is connected with the related roller, in each instance, so as to pivot.

In the case of such a manual pallet truck consisting of a lifting device and a supporting frame, the lifting device and the carrier frame are connected with one another in movable and inseparable manner. As a result, the manual pallet truck is heavy in weight and difficult to handle. It can be carried or lifted only by at least two persons. In this connection, the two persons are also exposed to significant risks of accident. This means that the manual pallet truck cannot be carried up a stair step or down a stair step by only one person, so that the pallet located on the manual pallet truck cannot be brought to the desired location with the manual pallet truck if there are height differences that must be overcome. In the case of a manual pallet truck as an industrial truck, such movements are generally not required. In special cases, however, this results in significant difficulties, because the pallet truck is stable and therefore heavy in weight. For an industrial truck, the amount of the weight is without significance, to a great extent, because it is only driven on a single plane, in other words not on planes of different levels.

The invention is based on the task of configuring a pallet truck in such a manner that it can be easily carried by one person if height differences are to be overcome.

This task is accomplished in that the head of the piston rod and the socket is secured against falling out by means of an easily releasable screw, and that the front arm of the linkage, in each instance, is arranged so as to rotate on the console, by means of a socket pin, and that the socket pin is secured against falling out by means of a holder pin.

In this manner, one arrives at a pallet truck of the type stated initially, which fully fulfills the aforementioned task. The screw guided by the socket can be released without using tools, because a wing nut is screwed onto the free end of the screw. The two socket pins on the console can also be easily released without using tools. As a result, there is the possibility of very quickly separating the lifting device and the supporting frame, with three manipulations, so that there are two parts, namely the lifting device, on the one hand, and the supporting frame, on the other hand. The lifting device alone can be easily carried from one plane to another plane, by way of a stair step, as can the supporting frame.

The two parts, namely the lifting device and the supporting frame, can be connected with one another again by means of three simple manipulations, after they have been brought to a different location.

Furthermore, the advantage of being able to divide the manual pallet truck into two parts consists in the fact that the manual pallet truck, when it is broken down into its two parts, can easily be lifted into a station wagon, passenger car, small truck or large truck, by only a single person, and stowed away there.

Assembly or disassembly of the pallet truck takes place without tools, and no individual parts have to be stored, which could possibly be lost. Assembly as well as disassembly are performed by a single person, during a short time of only a few seconds.

In a further embodiment of the invention, it is provided that the lifting device is configured as a thrust piston pump, the piston rod of which is mounted to be axially displaceable in the pump housing, and projects out of the pump housing in an upward direction. In this way, the supporting frame can be lifted and lowered with the required lift.

It is advantageous if the screw in the socket is passed through the side walls of the socket and a ring-shaped constriction in the top part of the piston rod.

It is practical if the socket pin is mounted in the console so as to rotate, and the holder pin is guided through the console and a ring-shaped constriction of the socket pin.

Furthermore, it is recommended that the screw and the holder pin as well as the socket pin are connected with one another by means of a chain.

It is practical if the pallet truck is configured in such a manner that a set of wheels having two wheels and an axle is provided, whereby a support is mounted to rotate on the axle, which support carries the console with the pump device.

A rod for lifting, lowering, pulling, pushing and steering the pallet truck can be provided on the console, which rod activates the pump device by being pivoted in the vertical plane.

To reduce the weight of the pallet truck, the bearers, the holder frame of the supporting frame, as well as the rod have openings or recesses.

The task underlying the invention is also accomplished in that the pallet truck can be broken down into two parts of approximately equal weight, and that the disassembled parts can be re-assembled to form the pallet truck.

It is practical if the solution to the task consists of being able to break the pallet truck down into the lifting device and the supporting frame, and that the lifting device and the supporting frame can be re-assembled to form the pallet truck.

In this way, the pallet truck can easily be broken down into the lifting device and the supporting frame, if necessary, so that subsequently, the lifting device can be brought to a different location by a single person, and the supporting frame can also be brought to the same different location by the same person, where the lifting device and the supporting frame can be easily re-assembled to form the pallet truck.

The two parts, namely the lifting device and the supporting frame, can be very quickly connected with one another again, after they have been brought to a different location.

In a further embodiment of the invention, it is provided that the lifting pump is configured as a thrust piston pump, the piston rod of which is mounted to be axially displaceable in the pump housing, and projects out of the housing in an upward direction. In this way, the supporting frame can be lifted and lowered with the required lift.

It is practical if the pallet truck is configured in such a manner that a spring-loaded snapper is provided in the holder frame, at the level of the piston rod head, which acts perpendicular to the piston rod axis, i.e. horizontally, which snapper is brought into and out of engagement with a constriction of the piston rod head.

It is recommended to provide a horizontally directed accommodation journal on the console, on both sides, in each instance.

The pallet truck can also be configured in such a manner that a toggle lever is mounted, in articulated manner, on the bearers, in each instance, each toggle lever having a bearing accommodation, open towards the front, to accommodate the accommodation journal, at its front end.

In addition, a holder bracket can be arranged so as to pivot, in the front region of the toggle lever, which bracket is to be pivoted over the bearing accommodation.

It is practical if the pallet truck is configured in such a manner that a set of wheels having two wheels and an axle is provided, whereby a support is mounted to rotate on the axle, which support carries the console with the pump device.

A rod for lifting, lowering, pulling, pushing and steering the pallet truck can be provided on the console, which rod activates the pump device by being pivoted in the vertical plane.

To reduce the weight of the pallet truck, the bearers, the holder frame of the supporting frame, as well as the rod have openings or recesses.

The one part of the pallet truck consists of the handle, the steering rod with the pump, the piston rod, and two wheels, while the other part of the pallet truck consists of the supporting frame, the toggle lever, two pulling rods, and two or four rollers.

Figure 2:
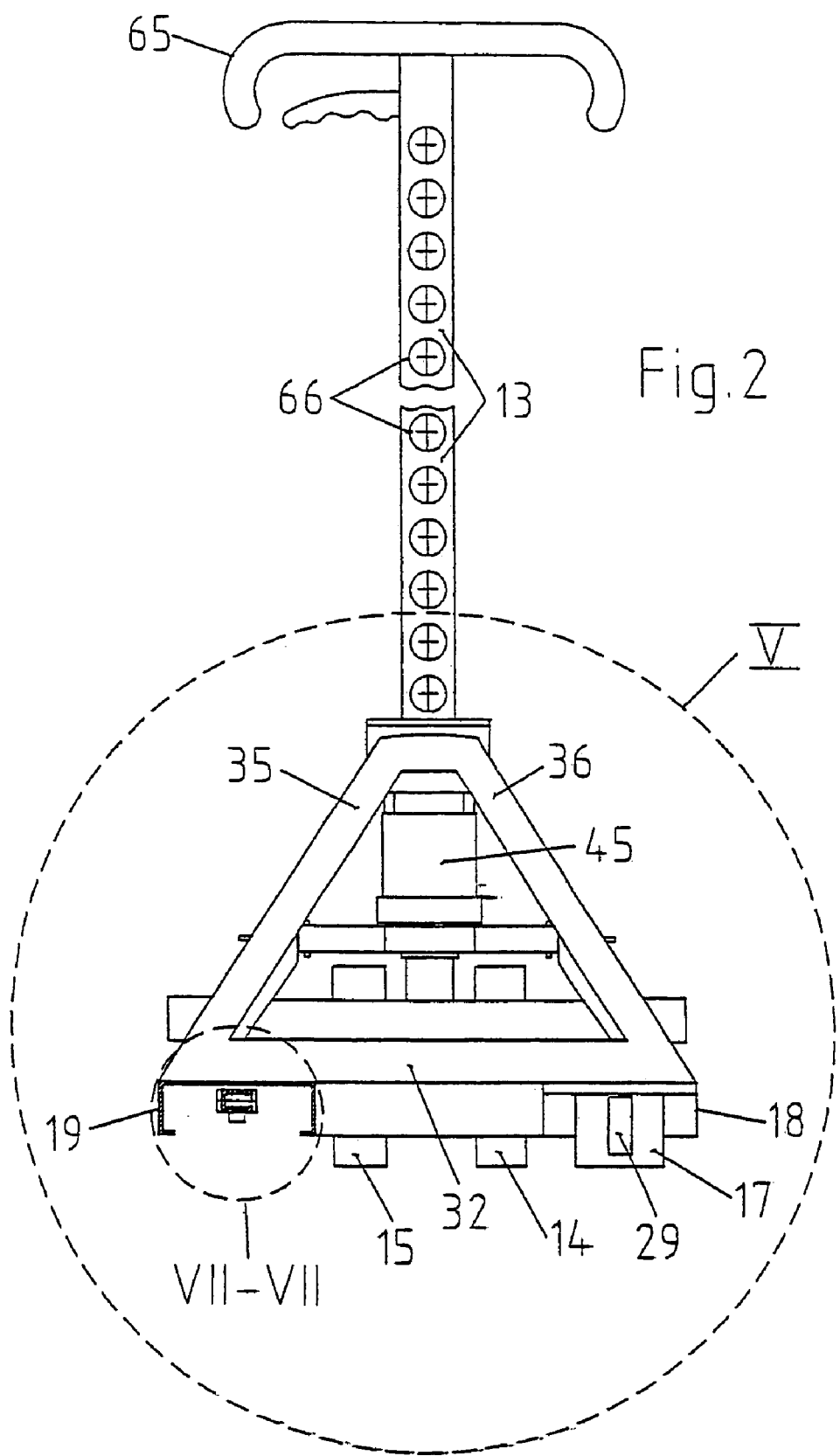
Figure 3:
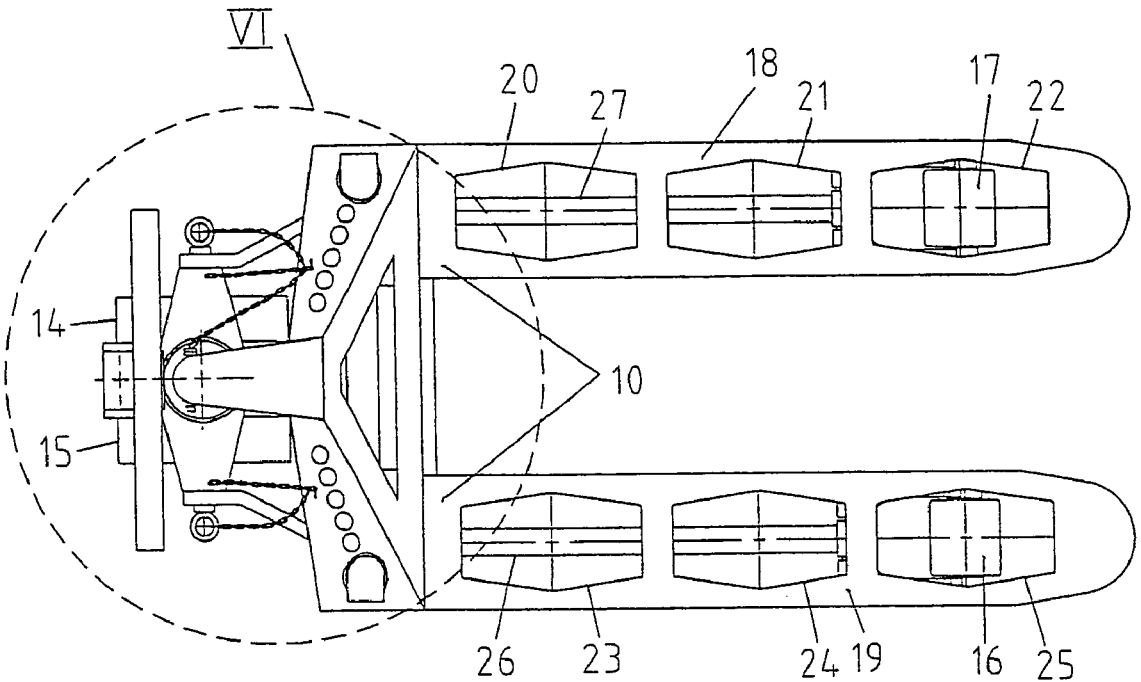
Figure 4:
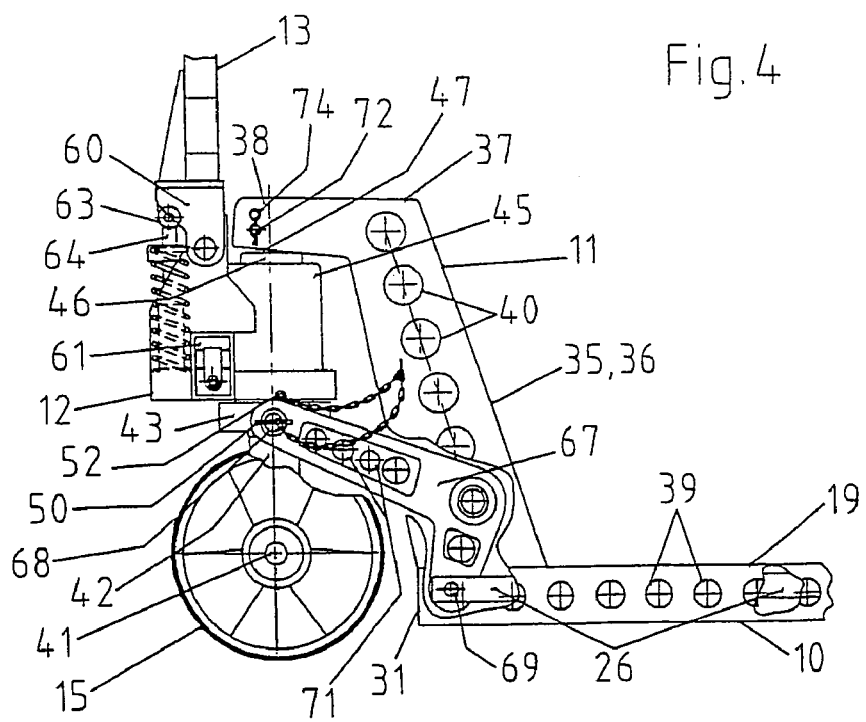
Figure 5:
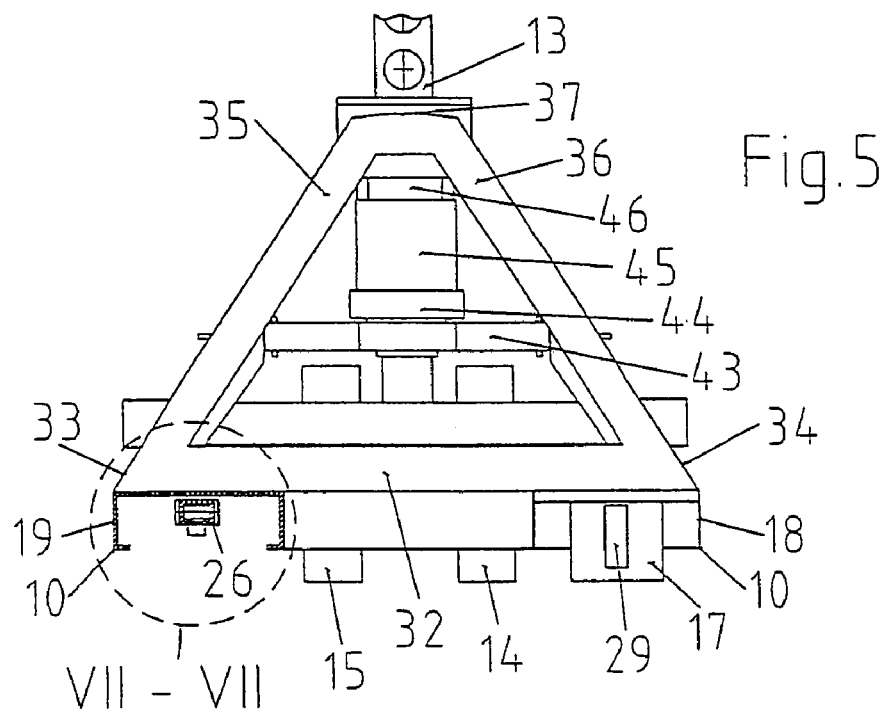
Figure 6:
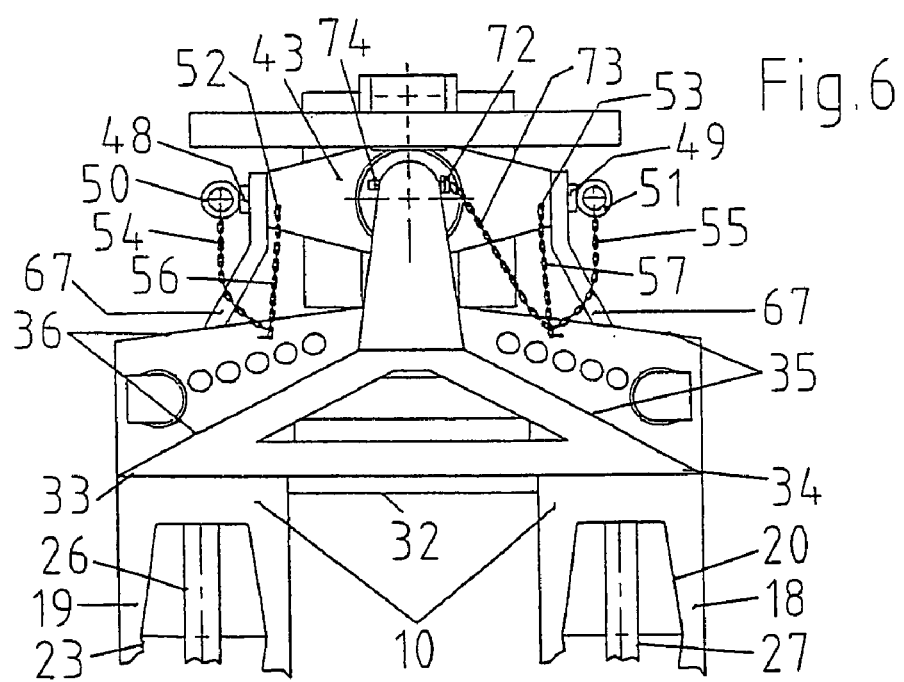
Figure 7:
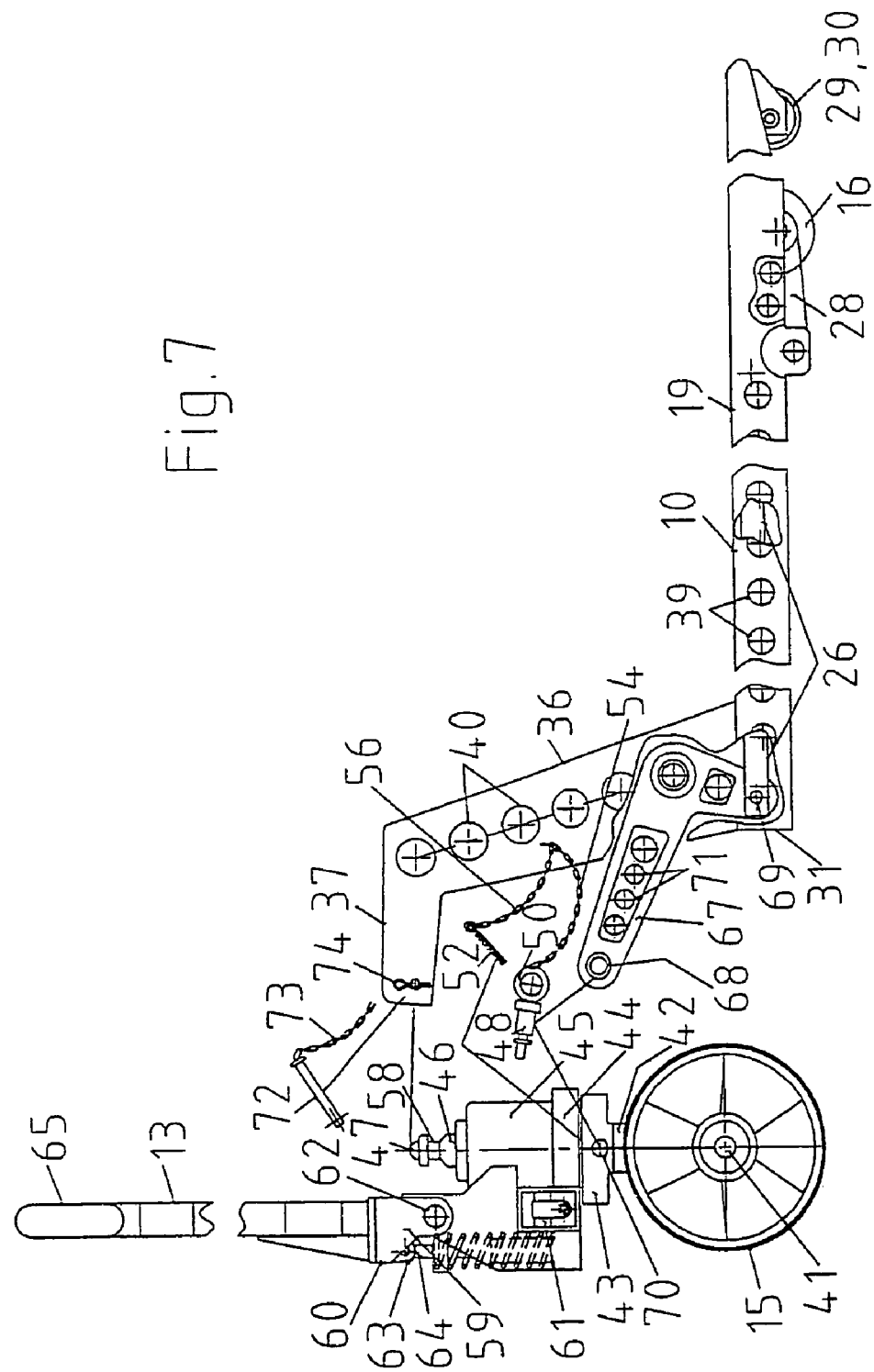
Figure 8:
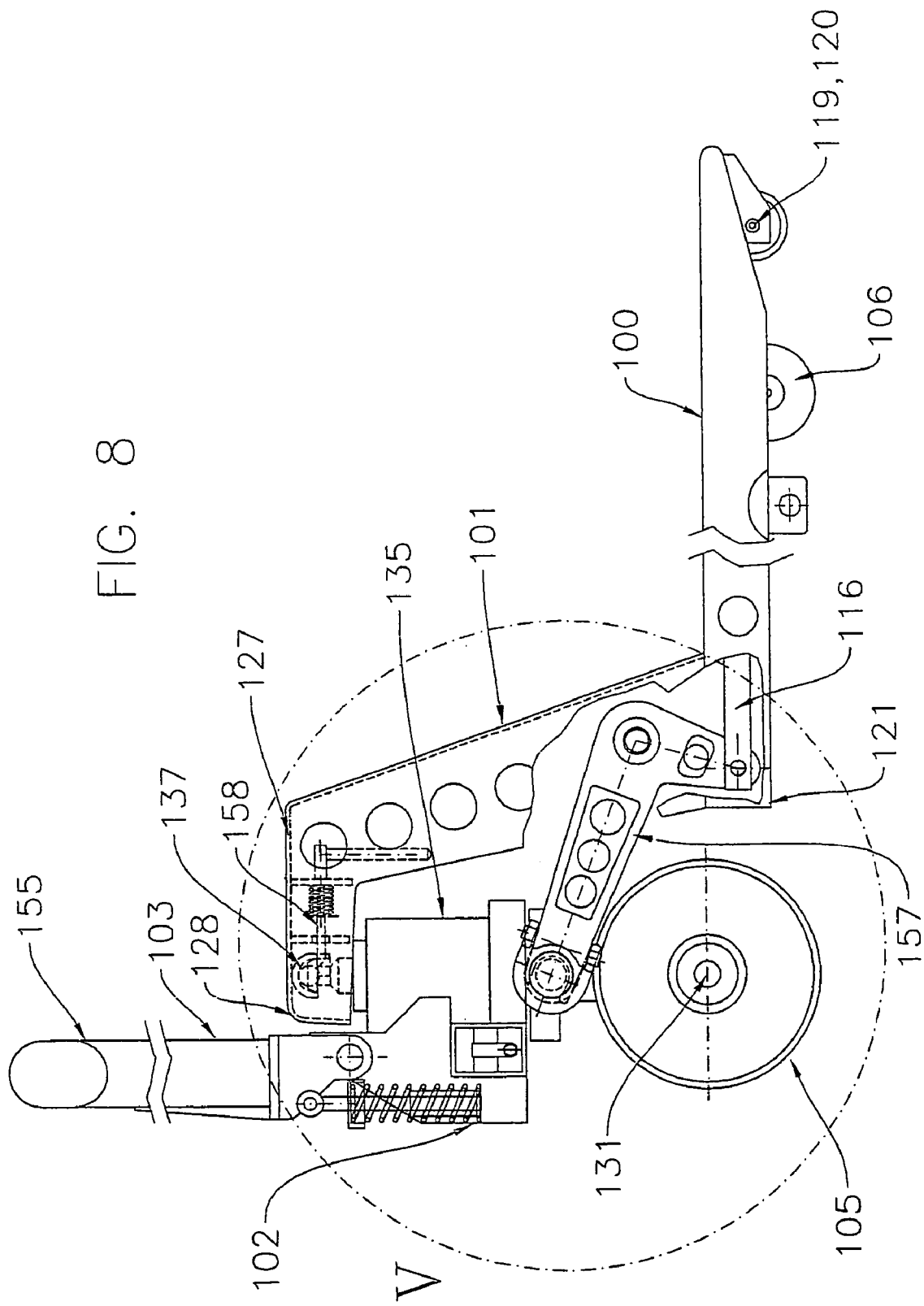
Figure 9:
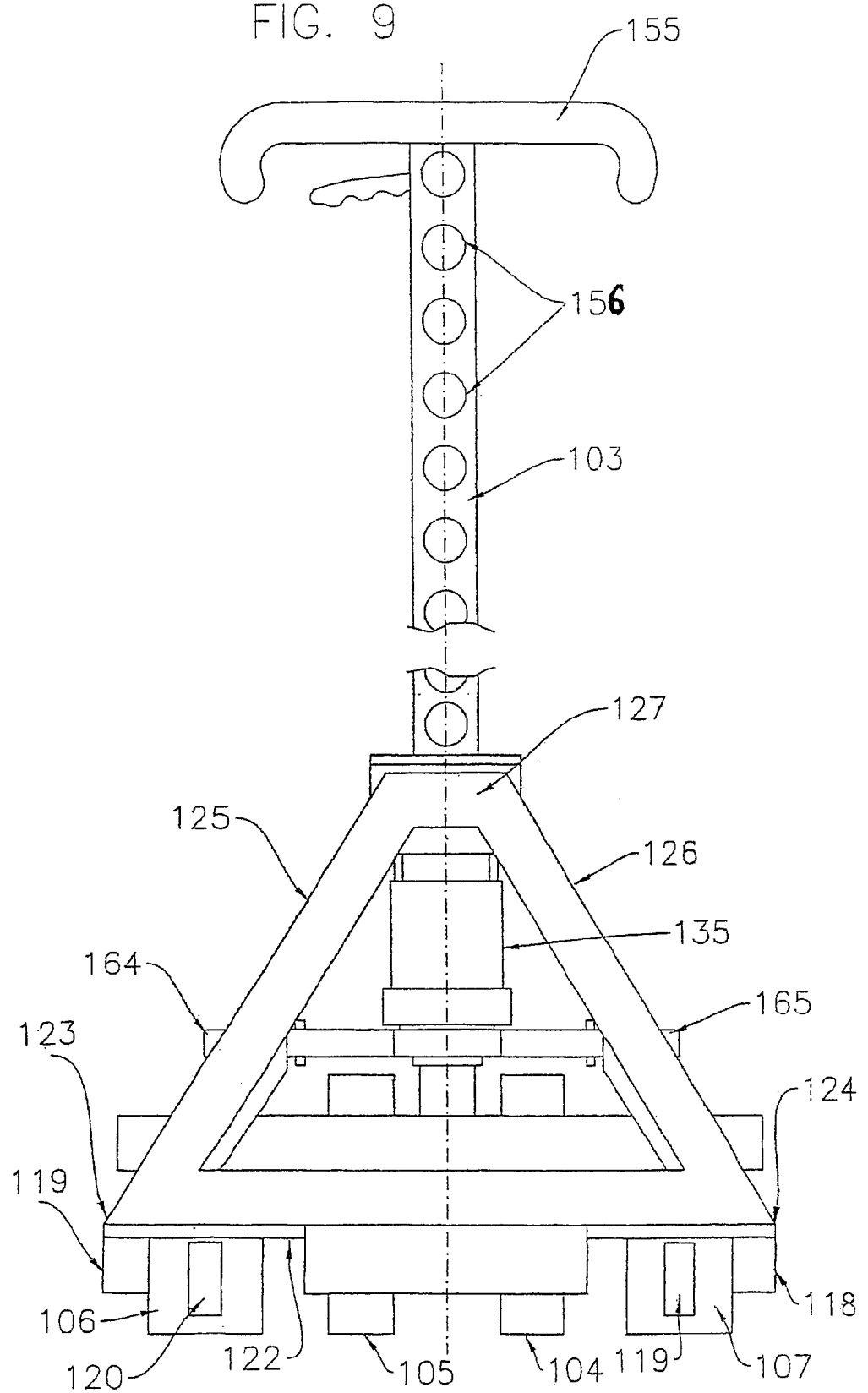
Figure 10:
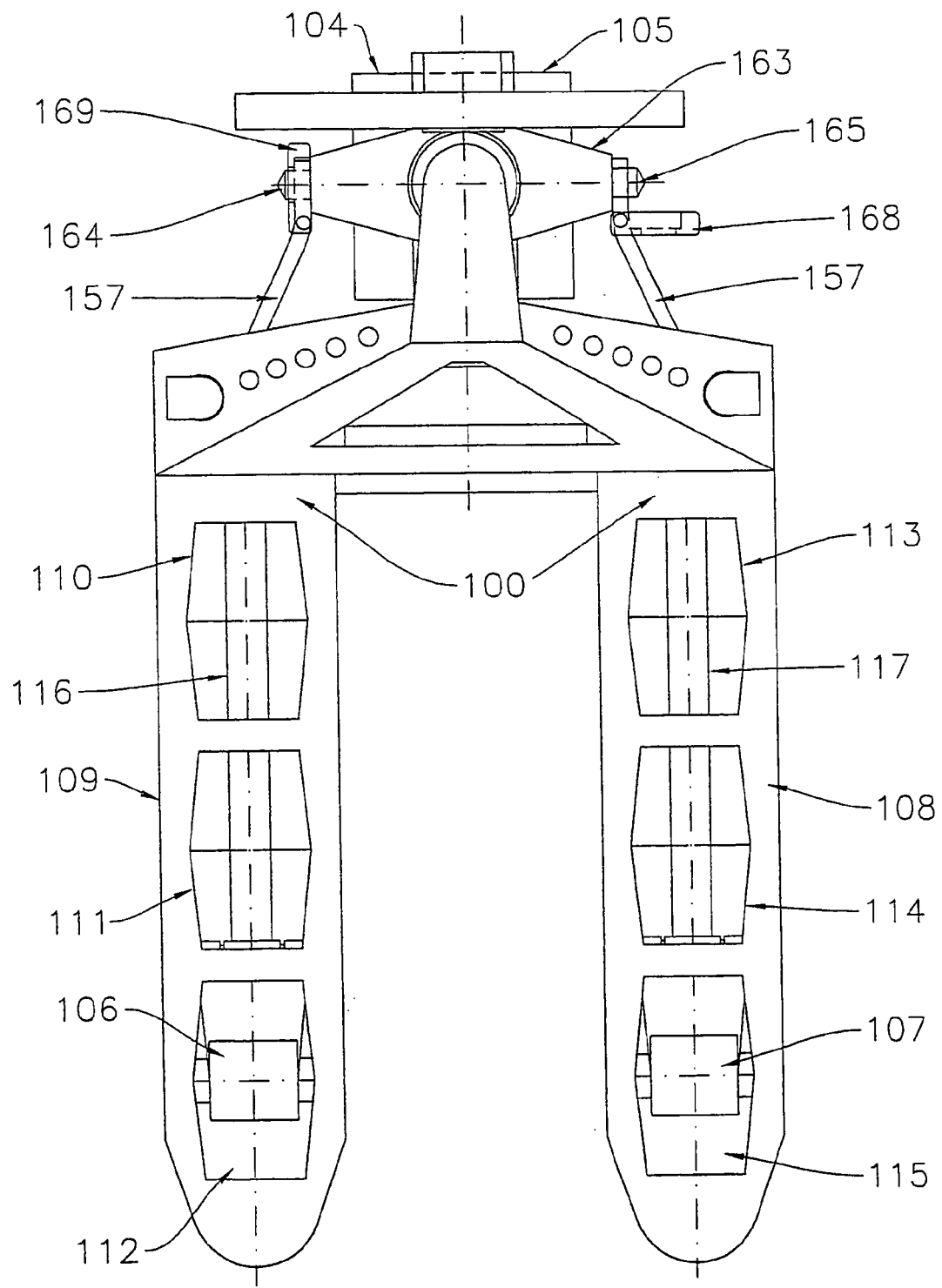
Figure 11:
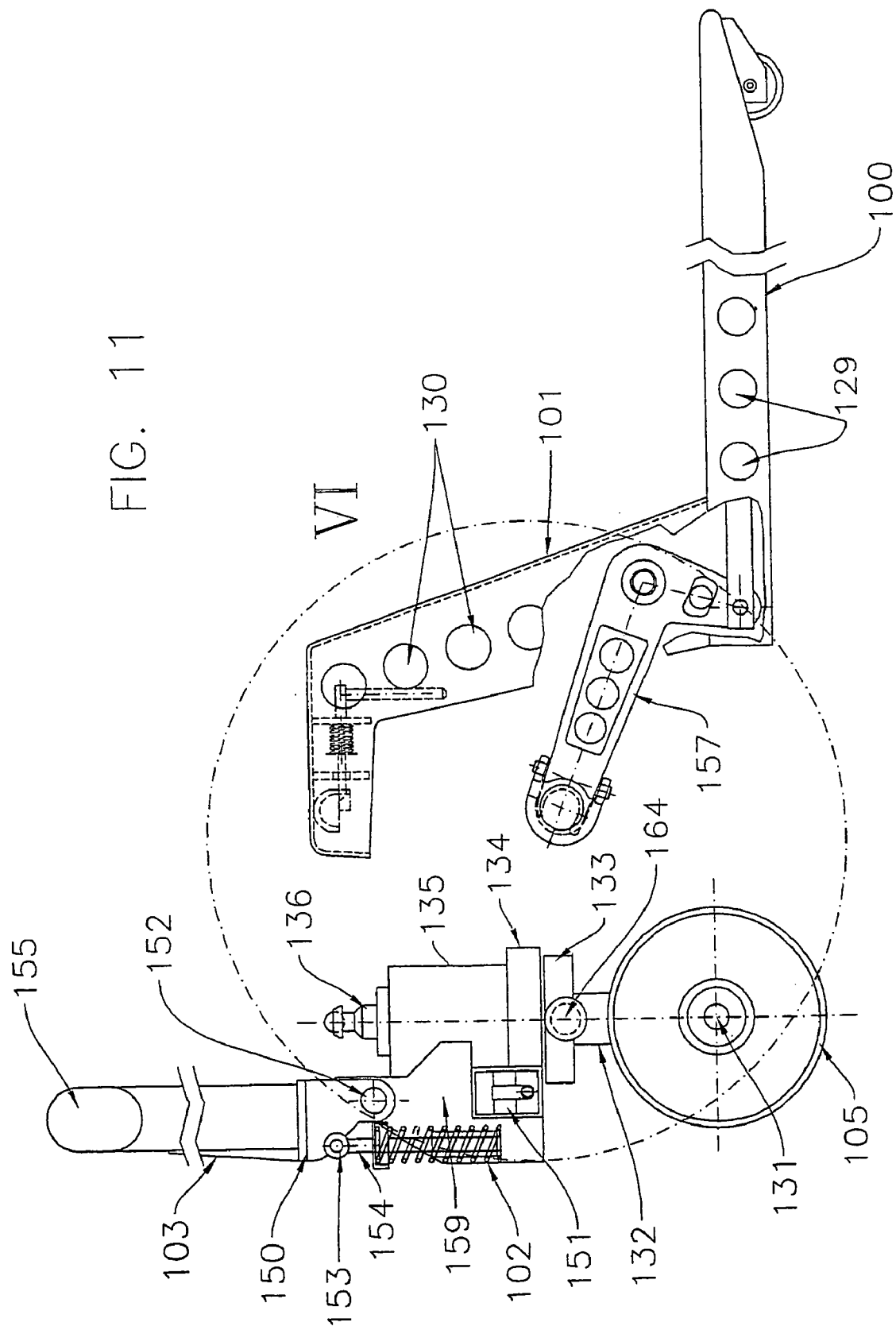
Figure 12:
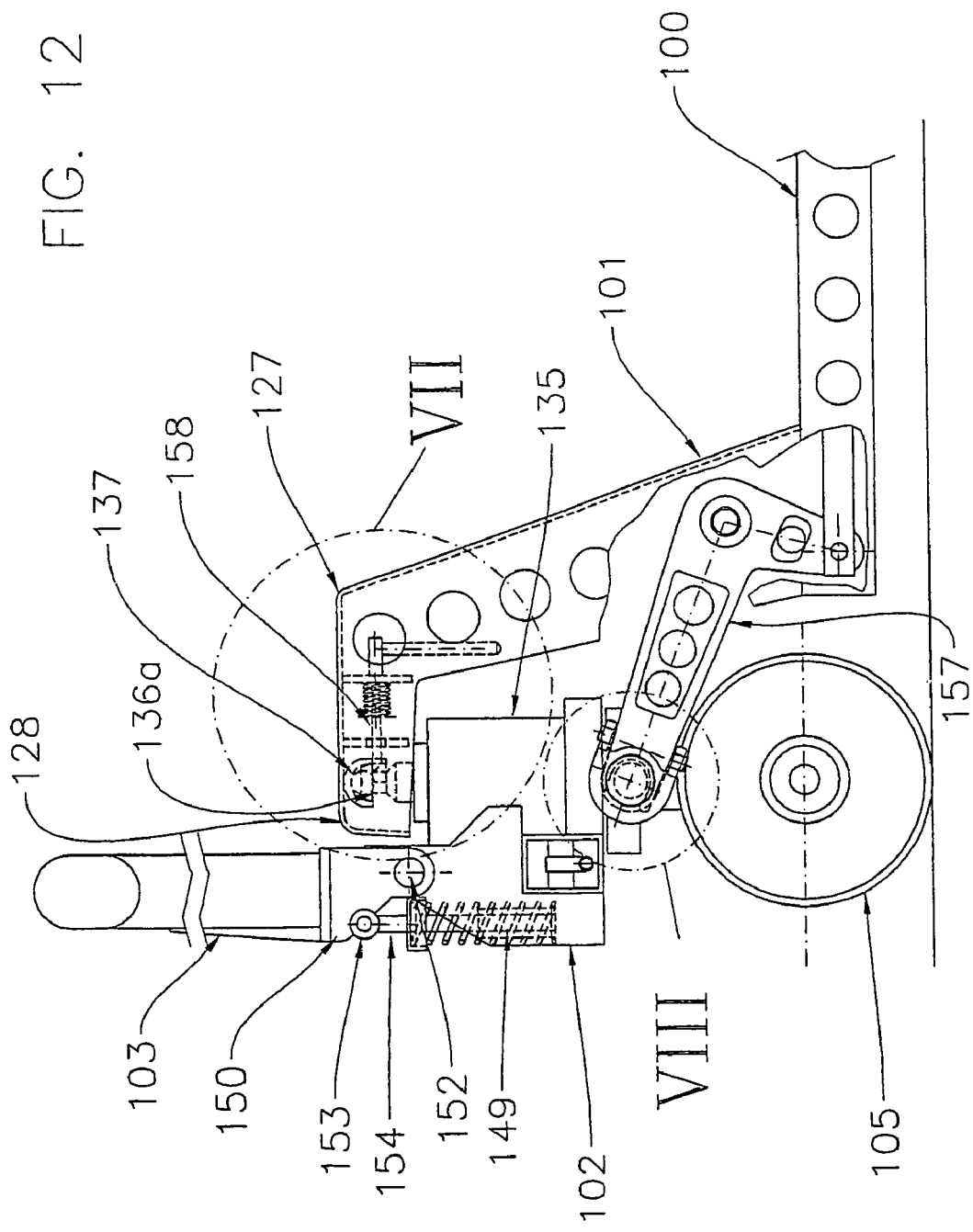
Figure 14A:
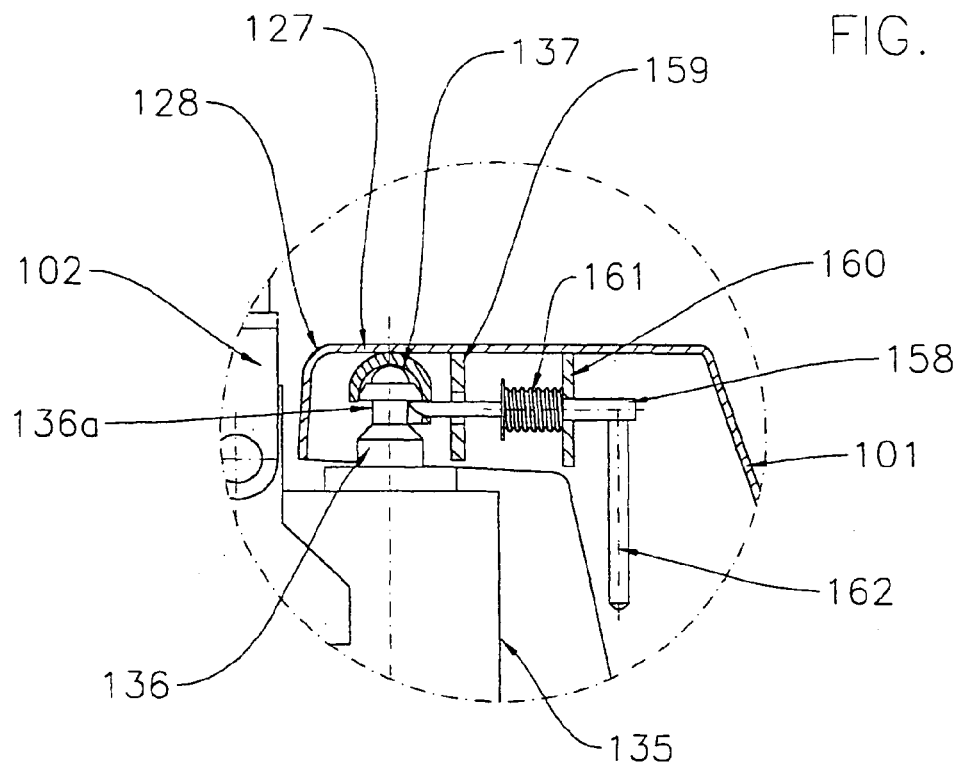
Figure 14B:
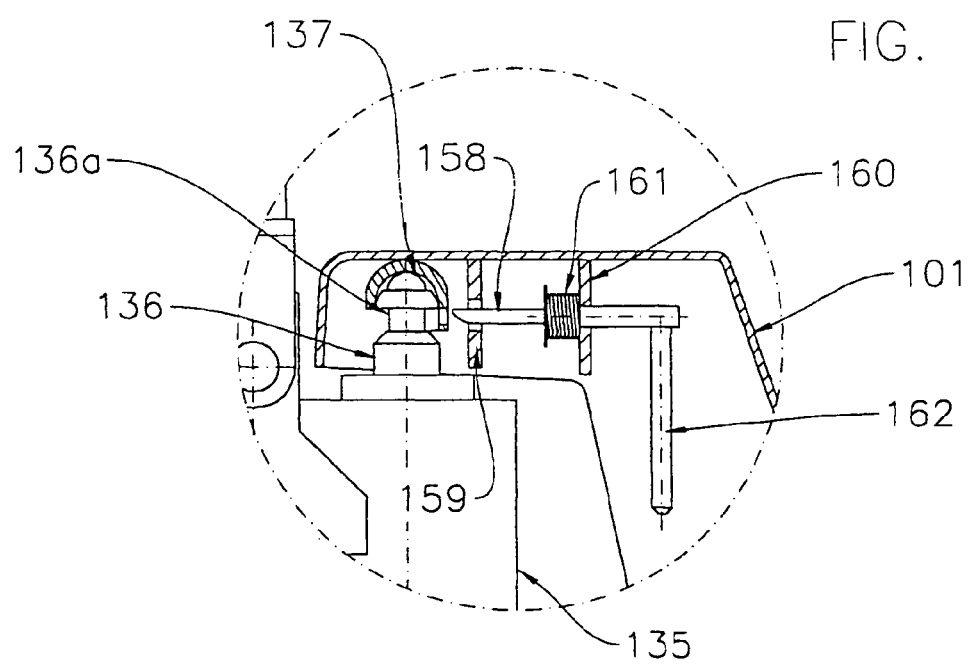
Figure 15:
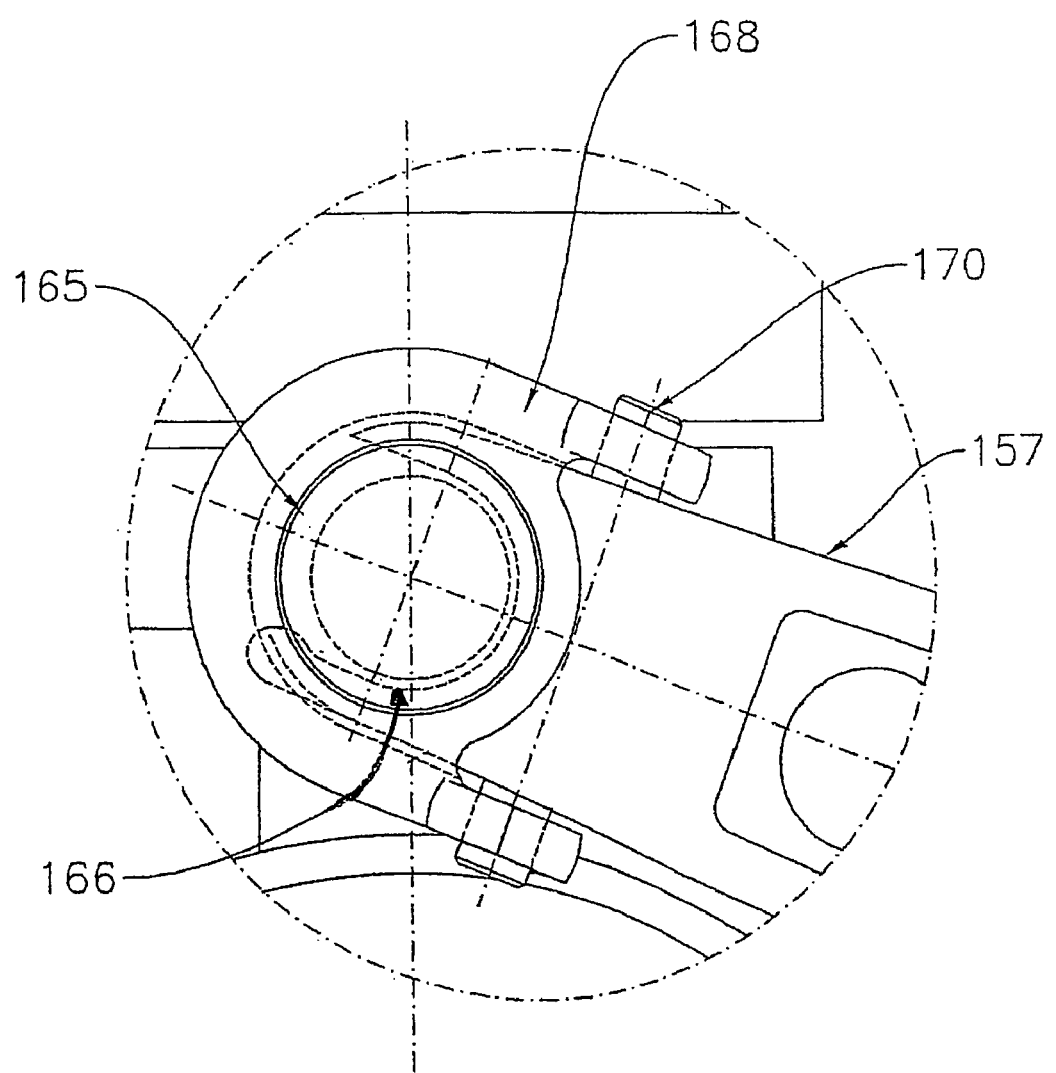
Figure 16A:
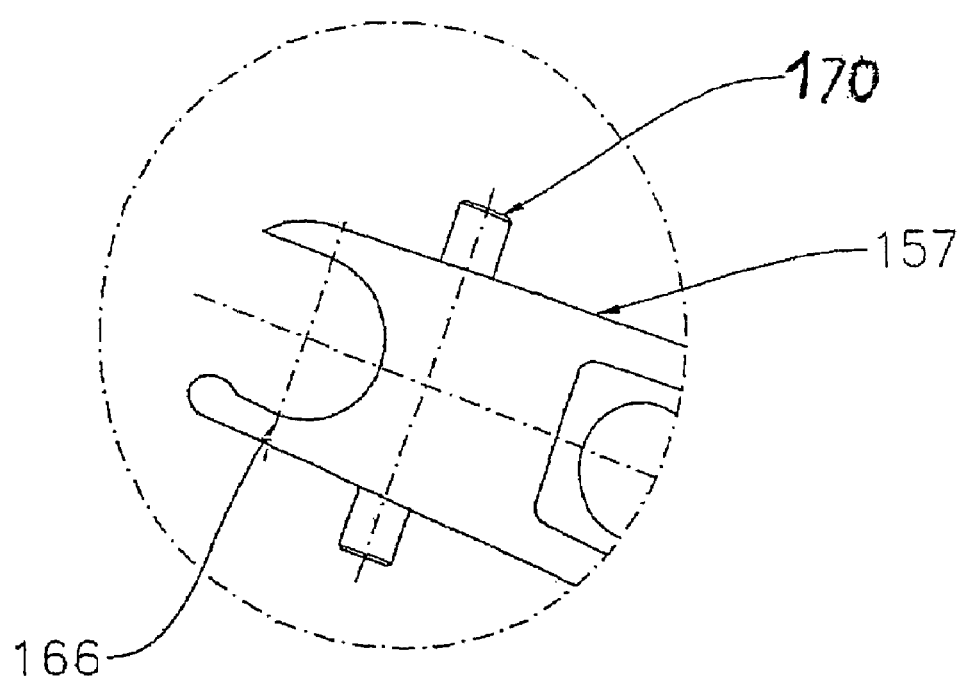
Figure 16B:
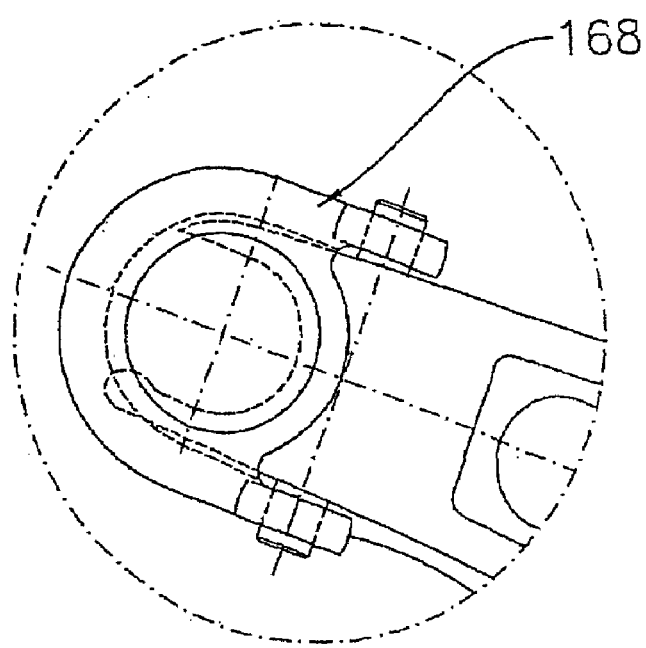

An exemplary embodiment of the pallet truck configured according to the invention is shown in the drawing. This shows:

FIG. 1 a side view of the pallet truck configured according to the invention,

FIG. 2 a front view, partially in cross-section, of the pallet truck according to FIG. 1, FIG. 3 a top view of the pallet truck according to FIG. 1, FIG. 4 an enlargement of part IV of FIG. 1, FIG. 5 an enlargement of part V of FIG. 2, FIG. 6 an enlargement of part VI of FIG. 3, FIG. 7 the pallet truck according to FIG. 1 in the disassembled state, FIG. 8 a side view of an alternative pallet truck configured according to the invention, partially in cross-section, FIG. 9 a front view of the pallet truck according to FIG. 1, FIG. 10 a side view of the pallet truck according to FIG. 1, FIG. 11 a representation corresponding to FIG. 1, but separated into the lifting device and the supporting frame, FIG. 12 an enlargement of part V of FIG. 1, FIG. 13 an enlargement of part VI of FIG. 4, FIG. 14a an enlargement of part VII of FIG. 5 in the closed state, FIG. 14b an enlargement of part VII of FIG. 5 in the open state, FIG. 15 an enlargement of part VIII of FIG. 5, FIG. 16a a representation according to FIG. 8 in the open state, FIG. 16b a representation according to FIG. 8 in the closed state, and FIG. 17 an enlargement of FIG. 3.

The pallet truck shown in FIGS. 1 to 7 and configured according to the invention has a supporting frame 10 having a holder frame 11 rigidly connected with it, which are movably connected with a lifting device 12, on which a rod 13 is arranged. The pallet truck is mounted on two front wheels 14, 15 and two back rollers 16, 17, so that it can be driven when it is loaded. In the unloaded state, it is mounted at the front on guide rollers 29, 30, when the back rollers 16, 17 are lifted up.

The supporting frame 10 has two bearers 18, 19, arranged at a distance from one another, in which openings 20, 21, 22, 23, 24, 25 are worked to save weight.

The back roller 16 is adjustable in height, by way of a lifting rod 26 and an adjustment gear mechanism 27, so that the back roller 16 is drawn up in the unloaded state of the supporting frame 10, and the supporting frame 10 is mounted on guide rollers 29, 30.

At the front end 31 of the supporting frame 10, a crossbar 32 is provided on the bearers 18, 19, at the two ends 33, 34 of which a bar 35, 36 directed at a slant in the upward direction and inwards is attached, in each instance, whereby the two bars 35, 36 end in a horizontally placed bearing bar 37 having a socket at the front end 38. Openings 39, 40 to reduce the weight are provided in the bearers 18, 19 and in the bars 35, 36.

A support 42 is provided on the axle 41 of the wheels 14, 15, on which a traverse 43 is arranged, on which (43) a console 44 is arranged. A pump housing 45 is arranged on the console 44, in which housing a piston rod 46 having a piston rod head 47 is mounted in the socket of the bearing bar 37, so as to be adjustable in height. Openings 48, 49 to reduce the weight are provided in the bars 35, 36.

In the traverse 43, a socket pin 48, 49 having a ring 50, 51, is inserted on both sides; it is secured against falling out with a holder pin 52, 53. The holder pin 52 is guided through a constriction 54 of the holder pin. The rings 50, 51 are connected with the bars 35, 36 by means of a chain 54, 55. Likewise, the holder pins 52, 53 are also connected with the bars 35, 36 by means of a chain 56, 57, so that the loosened socket pins 48, 49 and the holder pins 52, 53 that are also pulled out of the traverse 43 cannot get lost.

In the region of the socket, a holder pin 72 is guided through the socket and through a constriction 58 of the piston rod 46, through the front region of the bearing bar 37. This holder pin 72 is connected with the bar 35 by means of a chain 73, so that the holder pin 72 cannot get lost in the disassembled state of the pallet truck. The holder pin 72 is secured against falling out by means of a cotter pin 74.

A toggle lever 59 is provided on the pump housing 45, which lever consists of a top lever 60 and a bottom lever 61, which are connected with one another by way of an articulation 62, in articulated manner. Another articulation 63 is provided on the top lever 60, and acts on a rod 64 by way of which the lifting pump can be activated.

At the top of the rod 13, a handle 65 is provided. The rod 13 also has a plurality of openings 66 to reduce the weight.

A toggle lever 67 is mounted to rotate on the traverse 43 at its front end, with the bearing opening 68, and mounted to rotate on the lifting rod 26 with its back end, in the articulation 69, in that the front bearing opening 68 is attached in the bore 70 by means of the socket pin 48. The openings 71 serve to reduce the weight.

The pallet truck shown in FIGS. 8 to 17 and configured according to the invention has a supporting frame 100 having a holder frame 101 rigidly connected with it, which are movably connected with a lifting device 102, on which a rod 103 is arranged. The pallet truck is mounted on two front wheels 104, 105 and two back rollers 106, 107, so that it can be driven when it is loaded. In the unloaded state, it is mounted at the front on guide rollers 119, 120, when the back rollers 106, 107 are lifted up.

The supporting frame 100 has two bearers 108, 109, arranged at a distance from one another, in which openings 110, 111, 112, 113, 114, 115 are worked to save weight.

The back rollers 106, 107 are adjustable in height, by way of lifting rods 116, 117 and an adjustment gear mechanism 118, so that the back rollers 106, 107 are drawn up in the unloaded state of the supporting frame 100, and the supporting frame 100 is mounted on guide rollers 119, 120.

At the front end 121 of the supporting frame 100, a crossbar 122 is provided on the bearers 108, 109, at the two ends 123, 124 of which a bar 125, 126 directed at a slant in the upward direction and inwards is attached, in each instance, whereby the two bars 125, 126 end in a horizontally placed bearing bar 127 having a socket at the front end 128. Openings 129, 130 to reduce the weight are provided in the bearers 108, 109 and in the bars 125, 126.

A support 132 is provided on the axle 131 of the wheels 104, 105, on which a traverse 133 is arranged, on which (133) a console 134 is arranged. A pump housing 135 is arranged on the console 134, in which housing a piston rod 136 having a piston rod head 137 is mounted in the socket of the bearing bar 127, so as to be adjustable in height.

A toggle lever 149 is provided on the pump housing 135, which lever consists of a top lever 150 and a bottom lever 151, which are connected with one another by way of an articulation 152, in articulated manner. Another articulation 153 is provided on the top lever 150, and acts on a rod 154 by way of which the lifting pump can be activated.

At the top end of the rod 103, a handle 155 is provided. The rod 103 also has a plurality of openings 156 to reduce the weight.

Within the bearing bar 127, the piston rod head 137 is mounted in a suitable socket. At the level of the constriction 138 of the piston rod head 137, a snapper 158 is provided to move horizontally. The snapper 158 is mounted in two bearings 159 and 160, so it can be displaced lengthwise, and is subject to the pressure of a spring 161. The snapper 158 can be brought into and out of engagement with the constriction 138 by means of a handle 162.

In FIG. 14a, the snapper 158 is in the closed position, in which it engages in a constriction 138 of the piston rod 136 and thereby a rotating but rigid connection between the piston rod 136 and the bearing bar 127 is guaranteed, i.e. a rigid, rotating connection between the holder frame 101 and the lifting device 102.

In the representation according to FIG. 14b, the snapper 158 is pulled out of the constriction 138 of the piston rod 136, so that the piston rod 136 and the bearing bar 127 can be separated from one another.

As is evident from FIGS. 10 and 17, accommodation pins 164 and 165 are provided at both sides of the traverse 163. At the front end of the toggle lever 157, as is evident from FIG. 9a, a bearing opening 166 that is open towards the front is provided, which opening can be closed and opened by means of a bracket 167 that is arranged to pivot on the toggle lever 157. In this connection, FIG. 9a shows the open position and FIG. 9b shows the closed position.

According to the representation in FIGS. 10 and 17, the one bracket 168 is in the open position, while the bracket 169 arranged opposite the former is in the closed position and surrounds the accommodation pin 164.

FIG. 15 shows the toggle lever 157, at the front end of which the bracket 168 is mounted to pivot on the axis 170. In the closed state of the bracket 170, as shown, the accommodation pin 165 is rigidly arranged between the bearing opening 186 of the toggle lever 157 and the bracket 165.

In the closed state of the brackets 164 and 165, the lifting device 102 and the holder frame 101 of the pallet truck are rigidly connected with one another, but so as to rotate.

In the open state of the brackets 168 and 169, the toggle lever 157 and the accommodation pin 165 can be separated from one another. This means that the lifting device 102 and the holder frame 101 of the pallet truck can be separated from one another.

If the pallet truck shown in FIGS. 8 and 12, in which the lifting device 102 and the holder frame 101 are rigidly connected with one another, so as to rotate, in the region of the piston rod 136 and in the region of the two accommodation pins 164 and 165, are supposed to be separated into the lifting device 102 and the holder frame 101, as they are shown in FIGS. 11 and 13, first the snapper 158 is brought out of engagement on the handle 162, and the bar 127 is removed from the piston rod 138. Subsequently, the two closed brackets 168 and 169 are opened, so that the accommodation pins 164 and 165 are freed and the toggle lever 157 can be removed from the accommodation pins 164 and 165. With this, the lifting device 102 and the holder frame 101 of the pallet truck are separated from one another and can also be transported independent of one another, and carried by a single person.

If the separation of the pallet truck into the lifting device 102 and the holder frame 101 is supposed to be made retroactive again, the lifting device 102 is tilted towards the holder frame 101 so far that the pin head 137 can enter into the socket of the bearing bar 127. Subsequently, the lifting device 102 is set perpendicular again, so that the bearing opening 166 of the toggle lever 157 accommodates the accommodation pins 164 and 165. Afterwards, the two brackets 168 and 169, which were open until then, are closed again, so that in this way, the original state of the pallet truck is restored, namely the lifting device 102 and the holder frame 101 are rigidly connected with one another, in articulated manner.

| Reference Symbol List | |
|---|---|
| 10 | supporting frame |
| 11 | holder frame |
| 12 | lifting device |
| 14 | wheel |
| 15 | wheel |
| 16 | roller |
| 17 | roller |
| 18 | bearer |
| 19 | bearer |
| 20 | opening |
| 21 | opening |
| 22 | opening |
| 23 | opening |
| 24 | opening |
| 25 | opening |
| 26 | lifting rod |
| 27 | adjustment gear mechanism |
| 28 | linkage |
| 29 | guide roller |
| 30 | guide roller |
| 31 | front end |
| 32 | crossbar |
| 33 | end |
| 34 | end |
| 35 | bar |
| 36 | bar |
| 37 | bearing bar |
| 38 | end |
| 39 | openings |
| 40 | openings |
| 41 | axle |
| 42 | support |
| 43 | traverse |
| 44 | console |
| 45 | pump housing |
| 46 | piston rod |

-continued

| | Reference Symbol List |
|---|---|
| 47 | piston rod head |
| 48 | socket pin |
| 49 | socket pin |
| 50 | ring |
| 51 | ring |
| 52 | holder pin |
| 53 | holder pin |
| 54 | chain |
| 55 | chain |
| 56 | chain |
| 57 | chain |
| 58 | constriction |
| 59 | toggle lever |
| 60 | lever |
| 61 | lever |
| 62 | articulation |
| 63 | articulation |
| 64 | rod |
| 65 | handle |
| 66 | openings |
| 67 | toggle lever |
| 68 | bearing opening |
| 69 | bearing |
| 70 | bearing opening |
| 71 | openings |
| 72 | holder pin |
| 73 | chain |
| 74 | cotter pin |
| 100 | supporting frame |
| 101 | holder frame |
| 102 | lifting device |
| 103 | rod |
| 104 | front wheel |
| 105 | front wheel |
| 106 | back roller |
| 107 | back roller |
| 108 | bearer |
| 109 | bearer |
| 110 | opening |
| 111 | opening |
| 112 | opening |
| 113 | opening |
| 114 | opening |
| 115 | opening |
| 116 | lifting rod |
| 117 | lifting rod |
| 118 | adjustment gear mechanism |
| 119 | guide roller |
| 120 | guide roller |
| 121 | front end |
| 122 | crossbar |
| 123 | end of the crossbar |
| 124 | end of the crossbar |
| 125 | bar |
| 126 | bar |
| 127 | bearing bar |
| 128 | end |
| 129 | openings |
| 130 | openings |
| 131 | axle |
| 132 | support |
| 133 | traverse |
| 134 | console |
| 135 | pump housing |
| 136 | piston rod |
| 137 | piston rod head |
| 138 | constriction |
| 149 | toggle lever |
| 150 | top lever |
| 151 | bottom lever |
| 152 | articulation |
| 153 | articulation |
| 154 | rod |
| 155 | handle |
| 156 | openings |
| 157 | toggle lever |
| 158 | snapper |

-continued

| | Reference Symbol List |
|---|---|
| 159 | bearing |
| 160 | bearing |
| 161 | spring |
| 162 | handle |
| 163 | traverse |
| 164 | accommodation journal |
| 165 | accommodation journal |
| 166 | bearing |
| 167 | bracket |
| 168 | bracket |
| 169 | bracket |
| 170 | pivot axis |

The invention claimed is:

1. A pallet truck comprising:
(a) first and second wheels connected by an axle;
(b) a support mounted on said axle;
(c) a console arranged on said support and having first and second sides;
(d) a lifting device mounted on said axle comprising a lifting pump having a pump housing and a piston rod comprising a piston rod head projecting out of said pump housing in an upward direction, said lifting pump being arranged on said console;
(e) a rod arranged on said lifting pump;
(f) first and second rollers;
(g) a supporting frame movably connected with said lifting device and mounted on said first and second rollers comprising first and second bearers, said first bearer comprising a first back end and a first front end, said second bearer comprising a second back end and a second front end, said first roller being arranged on said first back end and said second roller being arranged on said second back end;
(h) a crossbar connecting said first and second bearers at said first and second front ends;
(i) a holder frame comprising a socket provided at said first and second front ends, said socket being mounted on said piston rod head in articulated manner;
(j) a two-armed linkage arranged on said first and second sides of said console, said two-armed linkage comprising first and second front arms rotatably connected with said console via respective first and second socket pins and first and second back rods pivotally connected with said first and second rollers respectively;
(k) an easily releasable screw securing said piston rod head and said socket against falling out; and
(l) first and second holder pins respectively securing said first and second socket pins against falling out.

2. The pallet truck as recited in claim 1, wherein the lifting device is configured as a thrust piston pump, the piston rod of which is mounted to be axially displaceable in the pump housing, and projects out of the pump housing in an upward direction.

3. The pallet truck as recited in claim 1, wherein the screw in the socket is passed through the side walls of the socket and a ringshaped constriction in the top part of the piston rod.

4. The pallet truck as recited in claim 1, wherein each socket pin is mounted in the console so as to rotate, and each holder pin is guided through the console and a ring-shaped constriction of the respective socket pin.

5. The pallet truck as recited in claim 1, wherein the screw and the respective holder pin as well as the respective socket pin are connected with one another by means of a chain.

6. The pallet truck as recited in claim 1, wherein said support is mounted to rotate on the axle, and carry the console with the lifting device.

7. The pallet truck as recited in claim 1, wherein a lifting rod for lifting, lowering, pulling, pushing and steering the pallet truck is provided on the console, said lifting rod activating the lifting device by being pivoted in the vertical plane.

8. The pallet truck as recited in claim 1, wherein the bearers the holder frame of the supporting frame, and the rod have openings or recesses.

9. A pallet truck comprising:
   (a) first and second wheels connected by an axle;
   (b) a support mounted on said axle;
   (c) a console arranged on said support and having first and second sides;
   (d) a lifting device mounted on said axle comprising a lifting pump having a pump housing and a piston rod comprising a piston rod axis and a piston rod head projecting out of said pump housing in an upward direction, said lifting pump being arranged on said console;
   (e) a rod arranged on said lifting pump;
   (f) first and second rollers;
   (g) a supporting frame movably connected with said lifting device and mounted on said first and second rollers comprising first and second bearers, said first bearer comprising a first back end and a first front end, said second bearer comprising a second back end and a second front end, said first roller being arranged on said first back end and said second roller being arranged on said second back end;
   (h) a crossbar connecting said first and second bearers at said first and second front ends;
   (i) a holder frame comprising a socket provided at said first and second front ends and a spring-loaded snapper at a level of said piston rod head, said socket being mounted on said piston rod head in articulated manner, said spring-loaded snapper acting perpendicular to the piston rod axis and being brought into and out of engagement with a constriction of the piston rod head; and
   (j) a two-armed linkage arranged on said first and second sides of said console, said two-armed linkage comprising first and second front arms connected with said console and first and second back rods pivotally connected with said first and second rollers respectively;
   wherein the pallet truck can be broken down into two parts of approximately equal weight, and the disassembled parts can be reassembled to form the pallet truck.

10. A pallet truck comprising:
   (a) first and second wheels connected by an axle;
   (b) a support mounted on said axle;
   (c) a console arranged on said support and having first and second sides and first and second horizontally directed accommodation journals arranged crosswise to a longitudinal axis of the pallet truck on said first and second sides respectively;
   (d) a lifting device mounted on said axle comprising a lifting pump having a pump housing and a piston rod comprising a piston rod head projecting out of said pump housing in an upward direction, said lifting pump being arranged on said console;
   (e) a rod arranged on said lifting pump;
   (f) first and second rollers;
   (g) a supporting frame movably connected with said lifting device and mounted on said first and second rollers comprising first and second bearers, said first bearer comprising a first back end and a first front end, said second bearer comprising a second back end and a second front end, said first roller being arranged on said first back end and said second roller being arranged on said second back end;
   (h) a crossbar connecting said first and second bearers at said first and second front ends;
   (i) a holder frame comprising a socket provided at said first and second front ends, said socket being mounted on said piston rod head in articulated manner; and
   (j) a two-armed linkage arranged on said first and second sides of said console, said two-armed linkage comprising first and second front arms connected with said console and first and second back rods pivotally connected with said first and second rollers respectively;
   wherein the pallet truck can be broken down into two parts of approximately equal weight, and the disassembled parts can be reassembled to form the pallet truck.

11. The pallet truck as recited in claim 10, wherein a toggle lever is mounted, in articulated manner, on the bearers, in each instance, each toggle lever having a bearing accommodation, open towards the front, to accommodate the accommodation journal, at its front end.

12. The pallet truck as recited in claim 11, wherein a holder bracket is arranged so as to pivot, in the front region of the toggle lever, which bracket is to be pivoted over the bearing accommodation.

13. A pallet truck comprising:
   (a) a supporting frame having a holder frame with guide rollers, a bearing bar, and first and second toggle levers;
   (b) a lifting device having wheels, a piston rod head, and a console, said lifting device being detachably and rotatably connected with said supporting frame, said bearing bar being detachably mounted by a socket on said piston rod head;
   (c) a traverse bearing the piston rod head, said toggle levers being detachably and rotatably mounted at opposite sides of said traverse or of said console;
   (d) first and second accommodation journals or bolts arranged at the console or the traverse;
   (e) first and second bearing accommodations mounting respectively the first and second toggle levers on the lifting device, each bearing accommodation having a respective front end for accommodating a respective one of said first and second accommodation journals or bolts arranged at the console or the traverse; and
   (f) first and second brackets arranged respectively at the first and second toggle levers so as to pivot and to respectively surround in a closed position the first and second accommodation journals or bolts so that each accommodation journal or bolt is openable and lockable, each accommodation journal or bolt being rigidly arranged between the respective bearing accommodation and the respective bracket in the closed position.

14. The pallet truck according to claim 13 further comprising a snapper and a piston rod having a constriction, said snapper engaging with the constriction.

15. The pallet truck according to claim 14 further comprising first and second bearings arranged at the bearing bar, said snapper being mounted in said bearings so as to be horizontally moveable and lengthwise displaceable.

16. The pallet truck according to claim 14 further comprising a spring exerting a pressure, wherein the snapper is disengageable from the constriction against the pressure of the spring.

17. The pallet truck according to claim 13, wherein the accommodation journals or bolts are respectively arranged at one side of the transverse or of the console crosswise to a longitudinal axis of the pallet truck.

18. The pallet truck according to claim 13, wherein the accommodation journals or bolts are horizontally directed.

19. The pallet truck according to claim 13, wherein each bracket is arranged in a front region of a respective toggle lever so as to pivot on an axis.

20. The pallet truck according to claim 13 further comprising first and second bearers pivotally mounting said first and second toggle levers respectively.

21. A pallet truck comprising:
(a) a supporting frame having a holder frame with guide rollers, a bearing bar, and first and second toggle levers;
(b) a lifting device having wheels, a piston rod head, and a console, said lifting device being detachably and rotatably connected with said supporting frame, said bearing bar being detachably mounted by a socket on said piston rod head;
(c) a traverse bearing the piston rod head, said toggle levers being detachably and rotatably mounted at opposite sides of said traverse or of said console;
(d) first and second front bearing openings; and
(e) first and second socket pins penetrating the first and second front bearing openings respectively and respectively received in bores of the traverse or the console.

22. The pallet truck according to claim 21 further comprising a holder pin and a piston rod having a constriction, said holder pin extending through the socket and through the constriction of the piston rod.

23. The pallet truck according to claim 22, wherein the holder pin extends through side walls of the socket and the constriction is ring-shaped.

24. The pallet truck according to claim 22 further comprising a cotter pin securing the holder pin from falling out.

25. The pallet truck according to claim 22 further comprising a bar and a chain, said holder pin being connected with the bar via the chain.

26. The pallet truck according to claim 21 further comprising first and second holder pins, each holder pin being guided in a respective constriction of the socket pins.

27. The pallet truck according to claim 21 further comprising first and second holder pins inserted into the traverse or guided through the console.

28. The pallet truck according to claim 21 further comprising first and second holder pins, first and second bars, and first and second chains, each holder pin being connected to a respective bar via a respective chain.

29. The pallet truck according to claim 21 further comprising first and second bars and first and second chains, each socket pin being connected to a respective bar via a respective chain.

30. The pallet truck according to claim 21 further comprising first and second bearers pivotally mounting said first and second toggle levers respectively.

* * * * *

UNITED STATES PATENT AND TRADEMARK OFFICE
CERTIFICATE OF CORRECTION

PATENT NO. : 7,296,806 B2
APPLICATION NO. : 10/505271
DATED : November 20, 2007
INVENTOR(S) : Borrmann Page 1 of 1

It is certified that error appears in the above-identified patent and that said Letters Patent is hereby corrected as shown below:

In particular, in Column 8, line 62, (Line 3 of Claim 3), please change the word "ringshaped" to correctly read: --ring-shaped--.

In Column 9, line 5 (Line 2 of Claim 6), after the word "axle" please delete: ",".

In Column 9, line 13 (Line 2 of Claim 8), after the word "bearers" please insert: --,--.

Signed and Sealed this

Eighteenth Day of March, 2008

JON W. DUDAS
*Director of the United States Patent and Trademark Office*